United States Patent
Huang (10) Patent No.: US 8,531,272 B2
(45) Date of Patent: Sep. 10, 2013

(54) RFID APPARATUS, WIRELESS NETWORK PLATFORM, AND OPERATING METHOD THEREOF

(75) Inventor: Chih-Hua Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 787 days.

(21) Appl. No.: 12/704,765

(22) Filed: Feb. 12, 2010

(65) Prior Publication Data
US 2010/0225446 A1 Sep. 9, 2010

(30) Foreign Application Priority Data
Mar. 5, 2009 (TW) .............................. 98107126 A (51) Int. Cl.
*H04Q 5/22* (2006.01)
(52) U.S. Cl.
USPC ........ 340/10.1; 455/41.2; 455/41.3; 455/13.1
(58) Field of Classification Search
USPC ...................... 340/10.1; 455/13.1, 41.2, 41.3
See application file for complete search history.

(56) References Cited

U.S. PATENT DOCUMENTS

| | | | |
|---|---|---|---|
| 2005/0024187 A1* | 2/2005 | Kranz et al. | 340/10.33 |
| 2007/0045424 A1* | 3/2007 | Wang | 235/462.46 |
| 2007/0083294 A1* | 4/2007 | Bruno | 700/295 |
| 2008/0204193 A1* | 8/2008 | Zai et al. | 340/10.1 |
| 2009/0141668 A1* | 6/2009 | Zhang et al. | 370/315 |
| 2009/0245161 A1* | 10/2009 | Kimura et al. | 370/315 |

FOREIGN PATENT DOCUMENTS
CN 1832453 A 9/2006

OTHER PUBLICATIONS
Chinese Patent Office, Office Action 0910169CN, Oct. 26, 2011, 7 pages.

\* cited by examiner

*Primary Examiner* — Brian Zimmerman
*Assistant Examiner* — Omer S Khan
(74) *Attorney, Agent, or Firm* — Edell, Shapiro & Finnan, LLC (57) ABSTRACT

A radio frequency identification (RFID) apparatus includes a transmitting/receiving module and a determining module. When the transmitting/receiving module receives a radio frequency (RF) signal comprising a relay command, the determining module determines whether destination information of the relay command corresponds to the RFID apparatus and selectively transmits the content of the RF signal via the transmitting/receiving module.

4 Claims, 9 Drawing Sheets

Fig. 1(A)

| destination information | source information | command to be transmitted | check command |

RFID APPARATUS, WIRELESS NETWORK PLATFORM, AND OPERATING METHOD THEREOF

CROSS REFERENCE TO RELATED PATENT APPLICATION

This patent application is based on Taiwan, R.O.C. patent application No. 98107126 filed on Mar. 5, 2009.

FIELD OF THE INVENTION

The present invention relates to radio frequency identification (RFID), and more particularly, to an RFID apparatus, a wireless network platform and an operating method thereof.

BACKGROUND OF THE INVENTION

Research and development related to RFID have advanced in recent years, and products using RFID technology have also gradually earned a place in the market. In a word, RFID is a non-contact, automatic identification technology including a tag and a reader.

Generally speaking, a main operating principle of RFID technology is that a small RFID tag chip is set on or embedded in a product, and product information stored in the RFID tag chip is transmitted via RF signals to an RFID tag reader for tracking. Since manual operation is not required in implementing the RFID technology for identification, RFID technology is suitable for factory automation, goods sales, toll systems and vehicle identification.

For example, the recently-developed electronic product code (EPC) class-1 generation-2 (C1G2) ultra high frequency (UHF) RFID technology is mainly used for wireless identification. One significant difference between the G2 UHF RFID technology and a previous generation is that the data storage capacity of the G2 UHF RFID technology is much greater.

In RFID technology, when an RFID tag reader wishes to read information of a certain RFID tag, the RFID tag reader transmits a tag reading signal to the RFID tag. After the RFID tag receives the tag reading signal, the RFID tag generates and transmits a reply signal to the RFID tag reader. However, when various RFID tag readers wish to transmit messages to one another, each of the RFID tag readers needs an additional network unit to transmit messages via a network, and thus each of the RFID tag readers becomes a complicated and high cost terminal device that undesirably affect market competitiveness.

Therefore, an object of the present invention is to provide an RFID apparatus, a wireless network platform and an operating method thereof.

SUMMARY OF THE INVENTION

An RFID apparatus is provided in accordance with a first embodiment of the present invention. For example, the RFID apparatus is a UHF RFID tag reader. In this embodiment, the RFID apparatus comprises a transmitting/receiving module and a determining module. The transmitting/receiving module transmits and receives an RF signal complying with an RFID communication protocol. The determining module determines whether to allow the RFID apparatus to process content of the RF signal, or to keep the content of the RF signal intact and relay the RF signal via the transmitting/receiving module to a target RFID apparatus.

A method for operating an RFID apparatus is provided in accordance with a second embodiment of the present invention. When the RFID apparatus receives an RF signal, it is determined whether the RF signal comprises a relay command. When the RF signal comprises the relay signal, it is determined whether destination information of the relay command corresponds to the RFID apparatus. When the destination information does not correspond to the RFID apparatus, the RF signal is transmitted.

A wireless network platform comprising a plurality of RFID apparatuses is provided in accordance with a third embodiment of the present invention. Each of the RFID apparatus comprises a transmitting/receiving module and a determining module. The transmitting/receiving module transmits and receives an RF signal complying with an RFID communication protocol. The determining module determines whether to allow the RFID apparatus to process content of the RF signal, or whether to keep the content of the RF signal intact and relay the RF signal, i.e., the content thereof, via the transmitting/receiving module to a target RFID apparatus.

Thus, according to the present invention, an RFID apparatus is capable of building a wireless network platform via conventional wireless transmission characteristics, and various RFID apparatuses are capable of transmitting messages to one another via a relay approach. In addition, since each of the RFID apparatuses needs no additional network unit to achieve a function of transmitting messages to one another, architecture complexity and product cost of the RFID apparatus may be significantly reduced.

The advantages and spirit related to the present invention can be further understood via the following detailed description and drawings.

DETAILED DESCRIPTION OF THE PREFERRED EMBODIMENT

Figure 1A:
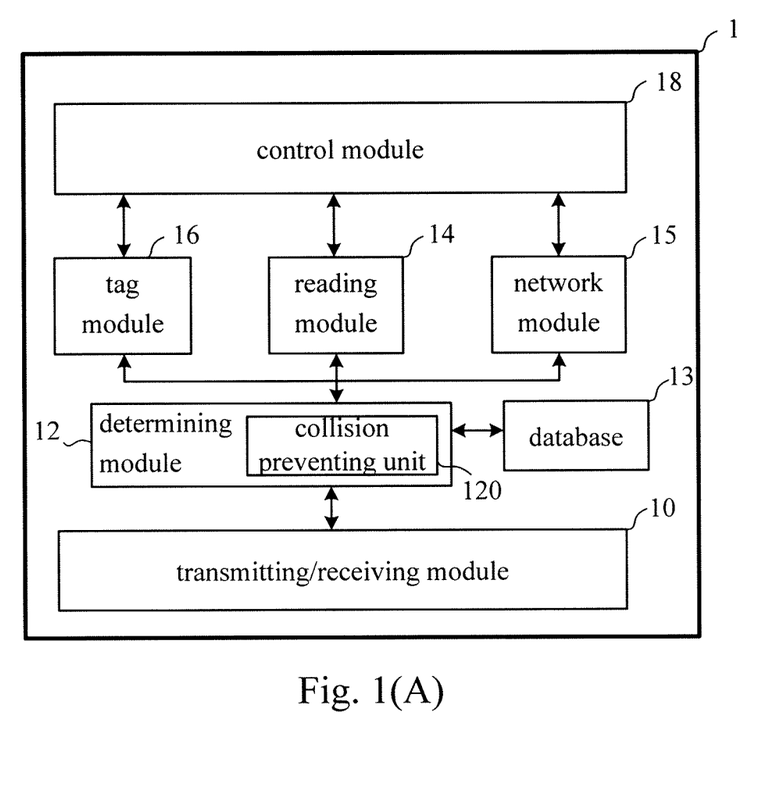
FIG. 1(A) is a block diagram of an RFID apparatus in accordance with a first embodiment of the present invention.

One main object of the present invention is to provide an RFID apparatus, a wireless network platform and an operating method thereof. In one embodiment, the RFID apparatus is a UHF RFID tag reader. FIG. 1(A) shows a block diagram of the RFID apparatus.

An RFID apparatus 1 comprises a transmitting/receiving module 10, a determining module 12, a database 13, a reading module 14, a network module 15, a tag module 16, and a control module 18. The determining module 12 further comprises a collision preventing unit 120. The determining module 12 is coupled to the transmitting/receiving module 10, the database 13, the reading module 14, the network module 15 and the tag module 16. The control module 18 is coupled to the reading module 14, the network module 15 and the tag module 16.

The RFID apparatus 1 is operative in three modes—a tag mode, a read mode, and a network mode. Generally, the RFID apparatus operates in a predetermined tag mode in which it is ready for receiving commands from other RFID apparatuses at all times.

The transmitting/receiving module 10 transmits and receives an RF signal complying with an RFID communication protocol. The determining module 12 determines whether to allow the RFID apparatus 1 to process content of the RF signal or not. When it is determined that the RFID apparatus 1 is to keep the content of the RF signal intact instead of processing it, the RFID tag relays the RF signal to a target RFID apparatus via the transmitting/receiving module 10.

When the transmitting/receiving module 10 receives the RF signal, the determining module 12 determines whether the RF signal comprises a relay command. When it is determined that the RF signal comprises the relay command, the determining module 12 defines the RFID apparatus 1 as being in the network mode and further determines a destination of the relay command. When it is determined that the destination of the relay command is the RFID apparatus 1, it means that information contained in the RF signal is to be relayed to the RFID apparatus 1, and accordingly the determining module 12 relays the RF signal to the network module 15. After receiving the RF signal, the network module 15 decapsulates an encapsulated command frame contained in the RF signal and transmits the decapsulated command to the control module 18 for subsequent processing.

Figure 1B:
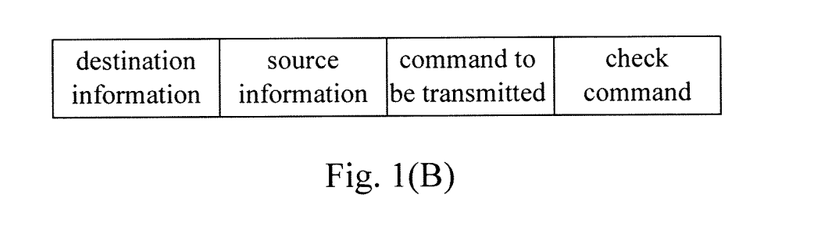
FIG. 1(B) is an example of a command frame.

Referring to FIG. 1(B), in this embodiment, "encapsulate" means adding destination information (e.g., an EPC of a relay destination), source information (e.g., an EPC of a relay source) and a check command (e.g., a checksum command) to the received command to form an encapsulated command frame. On the contrary, "decapsulate" means removing destination information, source information and a check command illustrated in FIG. 1(B) to obtain a command to be transmitted.

When it is determined that the destination of the relay command is not the RFID apparatus 1, it means that a final destination of the RF signal is not the RFID apparatus 1, and accordingly the determining module 12 transmits the RF signal to a next stage of RFID apparatus 1.

In a practical application, since the database 13 records and stores a plurality of relay paths, the determining module 12, through destination information (e.g., an EPC of a relay destination) and source information (e.g., an EPC of a relay source) in the relay command, as well as according to a predetermined condition, selects a best relay path from the database 13 and determines to which RFID device the RF signal is to be transmitted. In practice, the determining module 12 implements a longest prefix match (LPM) approach to find the best relay path from a number of possible relay paths. The predetermined condition may be a fixed user-defined condition or a dynamic condition adjusted according to dynamic detection results from executing a program in each of the RFID apparatuses. In addition, the relay paths are associated with EPCs of the RFID apparatus 1 and the target RFID apparatus.

In this embodiment, when the RF signal received by the transmitting/receiving module 10 does not comprise the relay command, the determining module 12 processes the relay command according to the current mode. In the tag mode, the RFID apparatus 1 serves as a tag and the RF signal comprises a reading command. The determining module 12 transmits the reading command to the tag module 16, and the control module 18 generates a reply signal according to the reading command and transmits the reply signal via the tag module 16 and the transmitting/receiving module 10. In the read mode, the RFID apparatus 1 serves as a tag reader, and the RF signal comprises a reply message transmitted from another RFID apparatus operating in the tag mode. In practice, after receiving the reading signal generated by the reading module 14 of the RFID apparatus 1, the another RFID apparatus generates the reply message according to the reading signal. The determining module 12 transmits the RF signal to the reading module 14 to read the reply message via the reading module 14.

Figure 2A:
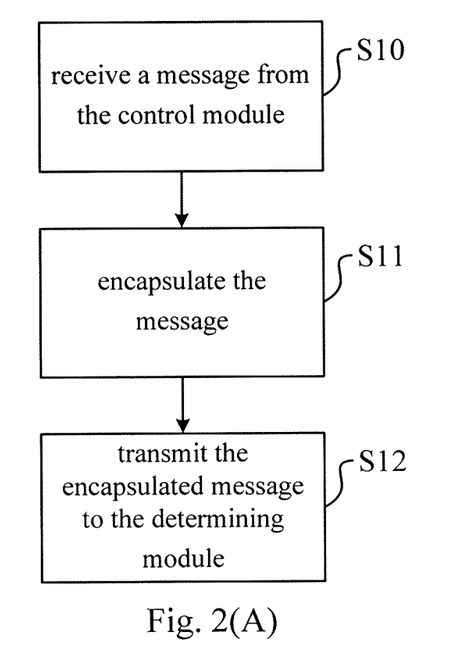
FIG. 2(A) and FIG. 2(B) respectively illustrate signal processing flows of a network module receiving messages from a control module and a determining module.
Figure 2B:
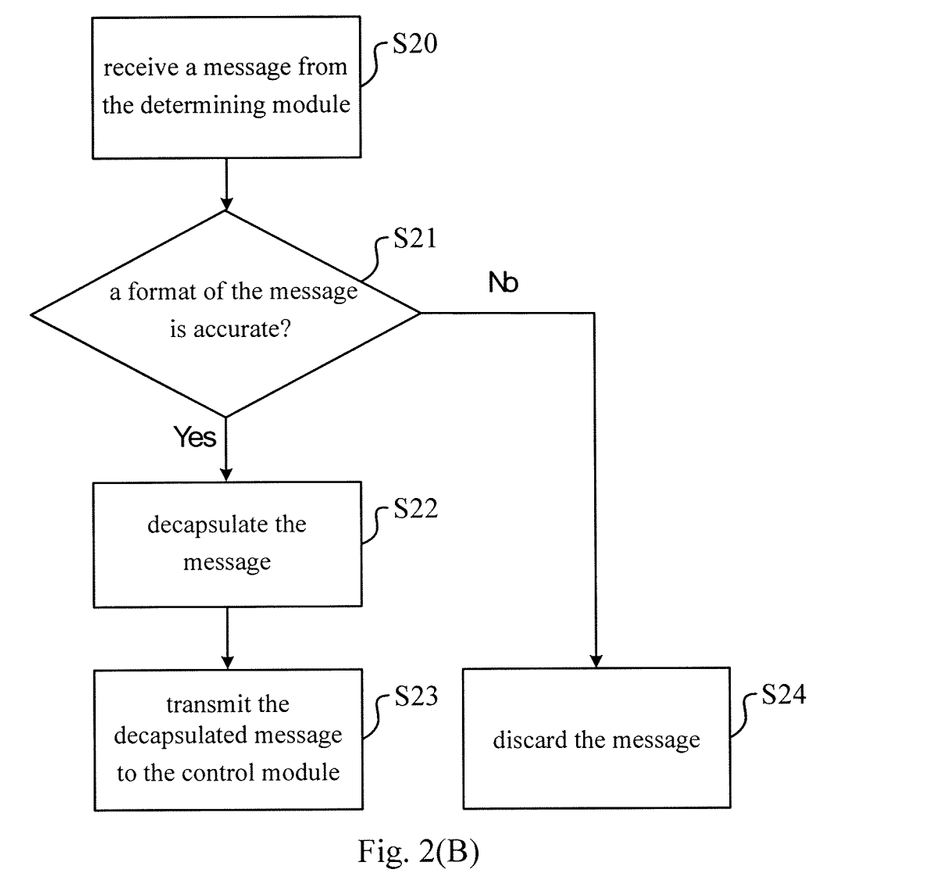

Signal processing flows of receiving messages by the network module 15 respectively from the control module 18 and the determining module 12 are discussed below. Refer to FIG. 2(A) and FIG. 2(B) respectively show signal processing flows of the network module 15 receiving a message from the control module 18 and the determining module 12. In Step S10, the network module 15 receives a message from the control module 18. More specifically, the message is internally generated by the RFID apparatus 1 rather than being received via the transmitting/receiving module 10. In Step S11, the network module 15 encapsulates the message. In Step S12, the network module 15 transmits the encapsulated message to the determining module 12 to complete the processing flow. Referring to FIG. 2(B), in Step S20, the network module 15 receives a message from the determining module 12. More specifically, the message is not internally generated by the RFID apparatus 1 but is received via the transmitting/receiving module 10 instead. In Step S21, the network module 15 determines whether a format of the message is accurate. When the answer of Step S21 is negative, it means that the message is an error message, and thus Step S24 in which the network module 15 discards the message is performed. When the answer of Step S21 is positive, it means that the message is a correct message, and thus Steps S22 and S23 are performed. In Steps S22 and S23, the network module 15 decapsulates the message and transmits the decapsulated message to the control module 18.

Figure 3:
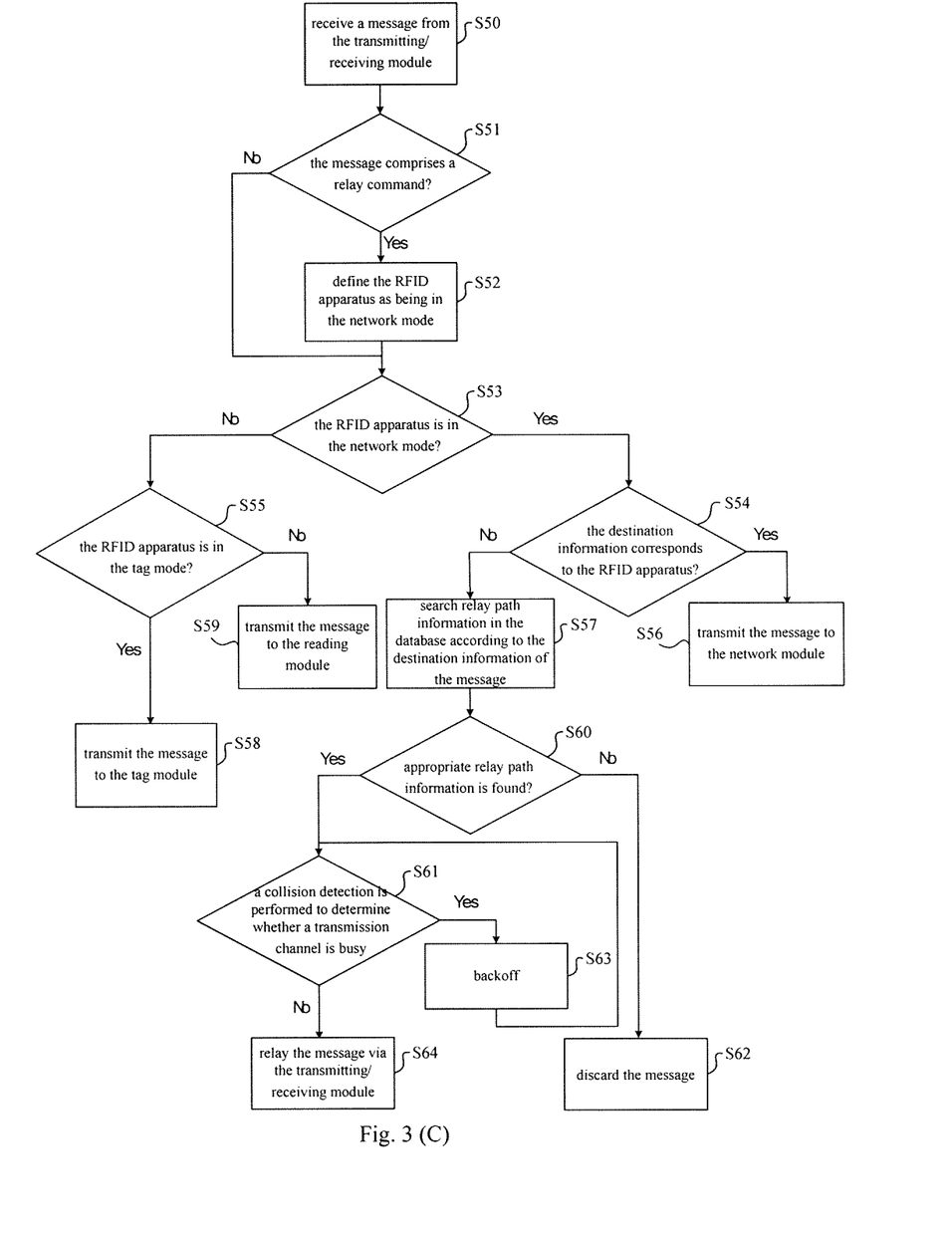
FIG. 3(A) illustrates a signal processing flow when a determining module receives a signal.
FIG. 3(B) and FIG. 3(C) illustrate signal processing flows of a determining module receiving messages respectively from a control module and a transmitting/receiving module.
Figure 3A:
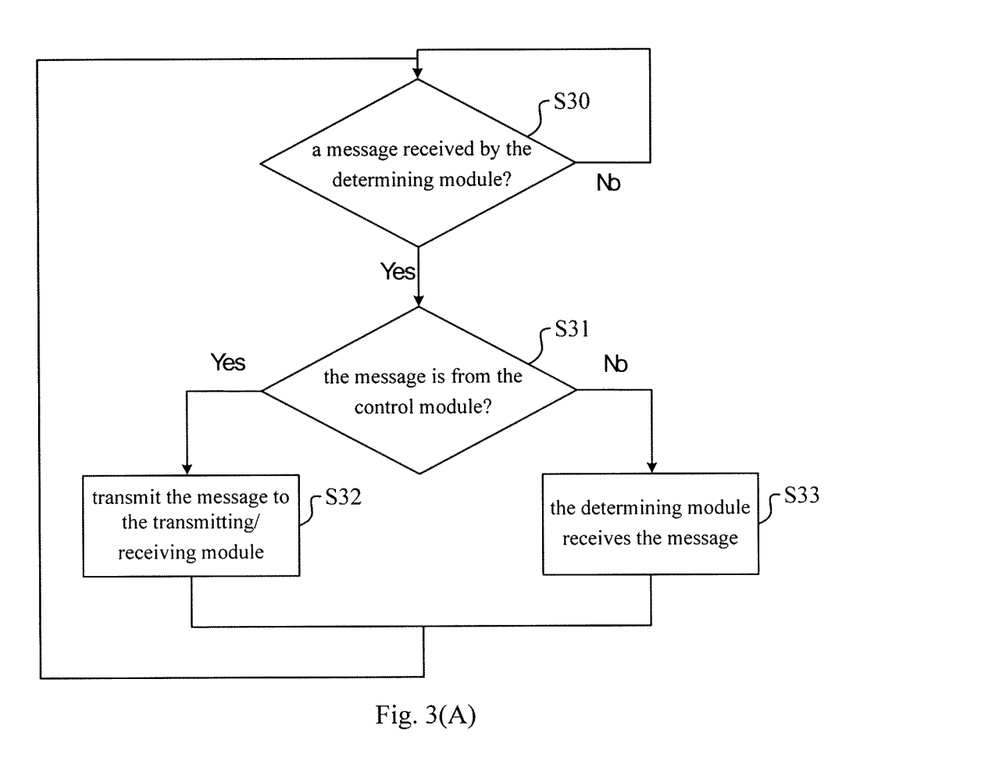

With reference to FIG. 3(A), a signal processing flow of the determining module 12 receiving a signal is discussed below. In Step S30, the determining module 12 determines whether it receives a message. When the answer of Step S30 is negative, the determining module 12 iterates Step S30; when the answer of Step S30 is positive, Step S31 in which the determining module 12 determines whether the message is from the control module 18 is performed. When the answer of Step S31 is positive, it means that the message is to be transmitted to the outside, and Step S32 is performed, i.e., the determining module 12 transmits the message to the transmitting/receiving module 10; otherwise, it means that the message is received from an external source, and Step S33 in which the determining module 12 receives the message is performed.

Figure 3B:
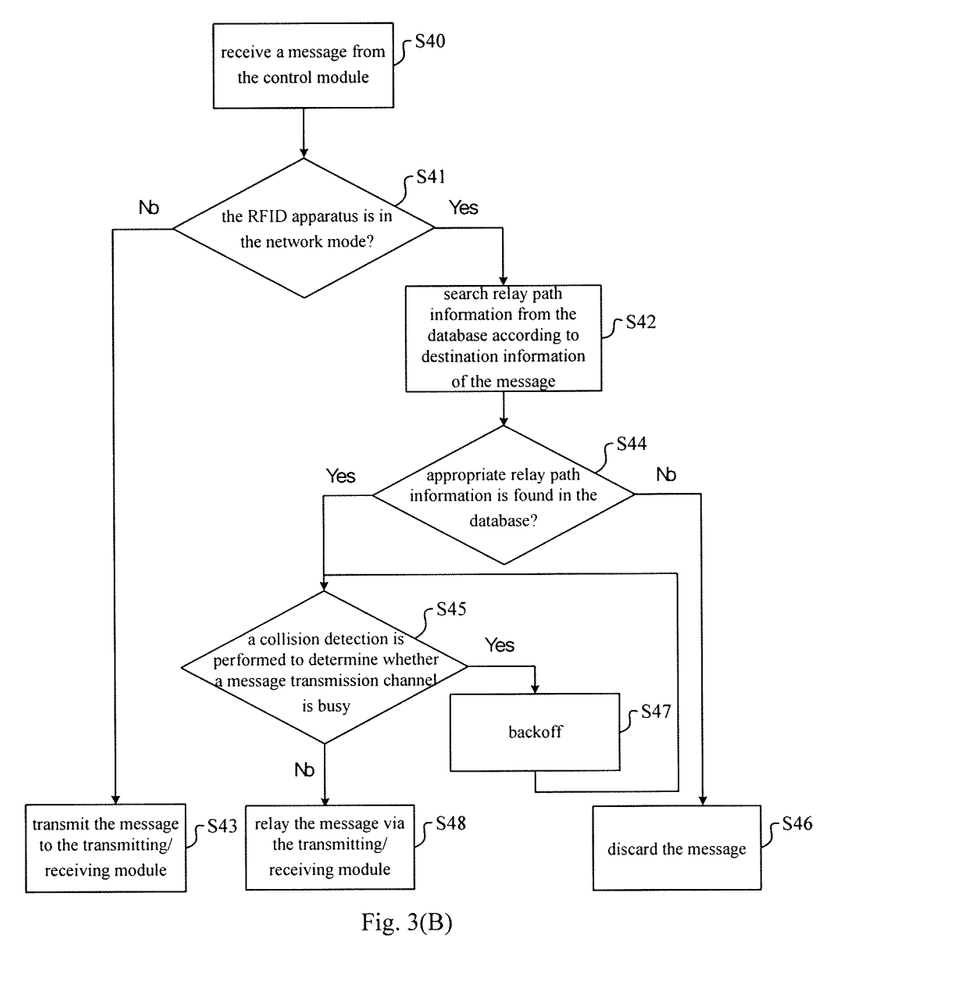

Signal processing flows of the determining module 12 receiving messages respectively from the control module 18 and the transmitting/receiving module 10 are discussed below. FIG. 3(B) and FIG. 3(C) respectively illustrate processing flows of the determining module 12 receiving messages from the control module 18 and the transmitting/receiving module 10. Referring to FIG. 3(B), in Step S40, the determining module 12 receives a message from the control module 18 via the reading module 14, the network module 15, or the tag module 16. In Step S41, the determining module 12 determines whether the RFID apparatus 1 is in the network mode. When the answer of Step S41 is negative, i.e., the RFID apparatus 1 is not in the network mode, Step S43 is performed; otherwise, Step S42 is performed. In Step S43, the determining module 12 transmits the message to the transmitting/receiving module 10. In Step S42, the determining module 12 searches relay path information from the database 13 according to destination information (e.g., an EPC of a destination RFID apparatus) of the message.

In Step S44, the determining module 12 further determines whether appropriate relay path information is found in the database 13. When the answer of Step S44 is negative, Step S46 is performed to discard the message; otherwise, Step S45 is performed. In Step S45, the determining module 12 performs collision detection with the collision preventing unit 120 to determine whether a message transmission channel is busy. When the answer of Step S45 is positive, i.e., the current message transmission channel is busy, Step S47 in which the message is backed-off for a predetermined period is performed and then Step S45 is repeated once after Step S47; otherwise, when the current transmission channel is available for transmission, Step S48 is performed. In Step S48, the determining module 12 relays the message via the transmitting/receiving module 10.

Referring to FIG. 3(C), in Step S50, the determining module 12 receives a message from the transmitting/receiving module 10. In Step S51, the determining module 12 determines whether the message comprises a relay command. When the answer of Step S51 is negative, Step S53 in which the determining module 12 directly determines whether the RFID apparatus 1 is in the network mode is performed; otherwise, Step S52 is performed and followed by Step S53. In Step S52, the determining module 12 defines the RFID apparatus 1 as being in the network mode.

When the answer of Step S53 is negative, i.e., the RFID apparatus 1 is not in the network mode 1, Step S55 in which the determining module 12 determines whether the RFID apparatus 1 is in the tag mode is performed. When the answer of Step S55 is positive, the determining module 12 performs Step S58 to transmit the message to the tag module 16; otherwise, when the RFID apparatus 1 is neither in the network mode nor in the tag mode, the determining 12 performs Step S59 to transmit the message to the reading module 14. The reading module 14 generates a reading signal according to content of the message and transmits the reading signal via the transmitting/receiving module 10.

When the answer of Step S53 is positive, i.e., the RFID apparatus 1 is in the network mode, the determining module 12 performs Step S54 to determine whether the destination information corresponds to the RFID apparatus 1. When the answer of Step S54 is positive, Step S56 in which the determining module 12 transmits the message to the network module 15 is performed; otherwise, Step S57 is performed. In Step S57, the determining module 12 searches relay path information in the database 13 according to the destination information of the message. In Step S60, the determining module 12 further determines whether appropriate relay path information is found in the database 13. When the answer of Step S60 is negative, Step S62 in which the determining module 12 discards the message is performed; otherwise, Step S61 is performed. In Step S61, the determining module 12 performs collision detection to determine whether a transmission channel is busy. When the answer of Step S61 is positive, Step S63 in which the message is backed-off for a predetermined period is performed and is then followed by iterating Step S61; otherwise, Step S64 is performed. In Step S64, the determining module 12 relays the message via the transmitting/receiving module 10.

Figure 4:
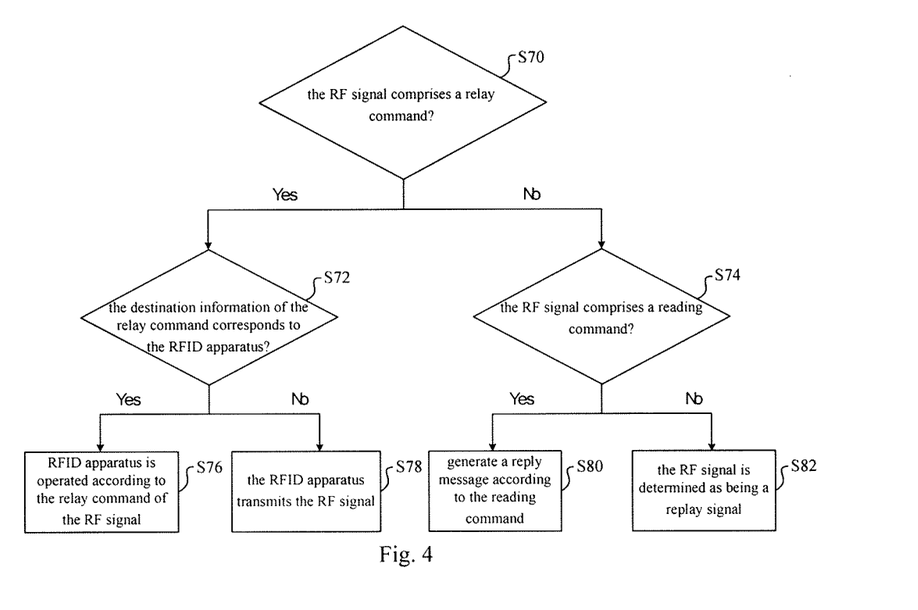
FIG. 4 is a flow chart of a method for operating an RFID apparatus in accordance with a second embodiment of the present invention.

A method for operating an RFID apparatus is provided in accordance with a second embodiment of the present invention. In practice, the RFID apparatus is a UHF RFID tag reader. FIG. 4 illustrates a flow chart of the method for operating an RFID apparatus. When the RFID apparatus receives an RF signal, Step S70 is performed to determine whether the RF signal comprises a relay command. In this embodiment, the purpose of performing Step S70 is to identify whether the RF signal received by the RFID apparatus needs to be transmitted.

When the answer of Step S70 is positive, i.e., the RF signal comprises the relay command, Step S72 is performed to determine whether destination information of the relay command corresponds to the RFID apparatus. When the answer of Step S72 is positive, i.e., the destination of the RF signal is the RFID apparatus, Step S76 in which the RFID apparatus is operated according to the relay command of the RF signal is performed.

When the answer of Step S72 is negative, i.e., relay destination of the RF signal is not the RFID apparatus, Step S78 in which the RFID apparatus transmits the RF signal to a next RFID apparatus is performed.

However, in a practical application, since it is possible that a great number of RFID apparatuses exist within a signal transmission range of the RFID apparatus, before Step S78, an appropriate relay path is first selected from a plurality of relay paths stored in a database to determine to which RFID apparatus the RF signal is to be transmitted. Moreover, When the RFID apparatus transmits the RF signal to another RFID apparatus, it is determined whether a transmission channel between the two RFID apparatuses is available. When the transmission channel is busy, transmission of the RF signal is backed-off for a predetermined period (e.g., a minute) before it is determined again whether the transmission channel is available to prevent signal jamming.

When answer of Step S70 is negative, i.e., the RF signal does not comprise a relay command, Step S74 is performed to determine whether the RF signal comprises a reading command. When the answer of Step S74 is positive, i.e., the RFID apparatus serves as a tag, Step S80 is performed to generate a reply message according to the reading command. When answer of Step S74 is negative, i.e., the RF signal does not comprise the reading command, Step S82 in which the RF signal is determined as being a replay signal is performed. At this point, the RFID apparatus serves as a tag reader.

Figure 5:
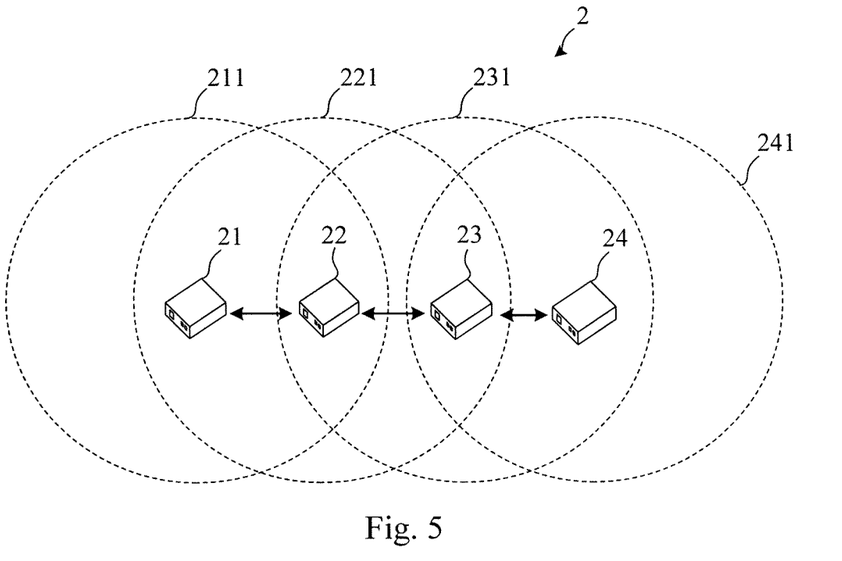
FIG. 5 is a schematic diagram of a wireless network platform in accordance with a third embodiment of the present invention.

A wireless network platform is provided in accordance with a third embodiment of the present invention. The wireless network platform comprises a plurality of RFID apparatuses. In this embodiment, the plurality of apparatuses may be UHF RFID tag readers. Referring to FIG. 5, a wireless network platform 2 comprises four RFID apparatuses 21 to 24, and ranges covered by transmitting signals from the RFID apparatuses 21 to 24 are respectively signal transmission ranges 211, 221, 231 and 241. In this embodiment, the RFID apparatuses 21 to 24 are arranged in an order from left to right, and each of the RFID apparatuses is within signal transmission ranges of adjacent RFID apparatuses. Detailed circuits of the RFID apparatuses 21 to 24 may be the same as those of the RFID apparatus illustrated in FIG. 1.

Since the signal transmission range 211 of the RFID apparatus 21 does not cover the RFID apparatus 23, when RFID apparatus 21 wishes to transmit a message to the RFID apparatus 23, the RFID apparatus 22 between the RFID apparatuses 21 and 23 is needed to help in transmitting the message—such operation is referred to as relay. A practical operating situation of the wireless network platform 2 shall be given below by taking transmission between the RFID apparatus 21 and the RFID apparatus 23 as an example.

Since the signal transmitting range 211 of the RFID apparatus 21 covers the RFID apparatus 22, the RFID apparatus 22 also receives RF signal transmitted by the RFID apparatus 21. When a transmitting/receiving module of the RFID apparatus 22 receives an RF signal, a determining module of the RFID apparatus 22 determines whether the RF signal comprises a relay command comprising destination information (e.g., an identification code of a relay destination) and source information (e.g., an identification code of a relay source). In practice, the identification codes may be represented by EPCs.

Supposing the RF signal comprises the relay command, the determining module then further determines whether the destination information of the relay command corresponds to the RFID apparatus 22. Two possible determined results are discussed below.

When the determining module determines that the destination information of the relay command corresponds to the RFID apparatus 22, the determining module transmits the RF signal to a network module to decapsulate the RF signal, and the decapsulated message is transmitted to a control module, which performs corresponding operations according to the RF signal.

When the determining module determines that the destination information of the relay command does not correspond to the RFID apparatus 22, the determining module transmits the RF signal to the transmitting/receiving module that further transmits the RF signal.

In a practical application, since various RFID apparatuses are within the signal transmission range 221 of the RFID apparatus 22, when the determining module determines that the destination information does not correspond to the RFID apparatus 22, the determining module needs to determine to which one of the RFID apparatuses the RF signal is to be transmitted. In this embodiment, a database stores a plurality of relay paths, and the determining module, on the basis of the destination information and the source information in the relay command, as well as according to a predetermined condition, selects an appropriate relay path to determine to which the RFID apparatus the RF signal is to be transmitted. For example, the determining module implements an LPM approach to find a best relay path from various possible relay paths. The predetermined condition may be a fixed user-defined condition, or a dynamic condition adjusted according to dynamic detection results detected by executing a program in each of RFID apparatuses.

In addition, when a collision preventing unit of the RFID apparatus 22 determines the transmission channel is busy, the transmitting/receiving module backs-off the transmitting the RF signal for a predetermined period (e.g., a minute) before it is again determined whether the transmission channel is available.

When the RF signal does not comprise the relay command, the determining module further determines whether the RF signal comprises a reading command or a reply message. When the RF signal comprises the reading command, it means that the RFID apparatus 22 serves as a tag at this point while other RFID apparatuses wish to read the tag, and thus the control module controls the tag module to generate a reply message according to the reading command and transmits the reply signal via the transmitting/receiving module.

When the RF signal comprises the reply message, it means that the RFID apparatus 22 serves as a tag reader at this point, and the determining module transmits the RF signal to the reading module that then reads the reply message. In practice, the control module of the tag reader controls the tag module to generate and transmit a reading signal to an RFID tag via the transmitting/receiving module, and the RFID tag generates the RF signal according to the reading signal.

In this embodiment, since the relay destination does not correspond to the RFID apparatus 22 and the determining module determines to transmit the RF signal to the RFID apparatus 23, the transmitting/receiving module transmits the RF signal to the RFID apparatus 23.

After receiving the RF signal comprising the relay command having destination information corresponding to the RFID apparatus 23, the RFID apparatus 23 performs corresponding operations on the RF signal.

In conclusion, according to the present invention, an RFID apparatus is capable of building a wireless network platform via conventional wireless transmission characteristics, and various RFID apparatuses are capable of transmitting messages to one another via a relay approach. In addition, since each of the RFID apparatuses needs no additional network unit to achieve a function of transmitting messages to one another, architecture complexity and product cost of the RFID apparatus may be significantly reduced.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A radio frequency identification (RFID) apparatus, comprising:
   a transmitting/receiving module, for transmitting and receiving an RF signal complying with an RFID communication protocol;
   a determining module, coupled to the transmitting/receiving module, for determining whether the RF signal comprises a relay command and further determining a target RFID apparatus according to the relay command, and determining to allow the RFID apparatus to process content of the RF signal when it is determined that the RF signal does not comprise a relay command or the RFID apparatus is the target RFID apparatus, or to keep the content of the RF signal intact and relay the RF signal to the target RFID apparatus via the transmitting/receiving module when it is determined that the RF signal comprises the relay command and the RFID apparatus is not the target RFID apparatus; and
   a database, coupled to the determining module, for recording a plurality of relay paths;
   wherein, when the determining module determines to relay the RF signal to the target RFID apparatus via the transmitting/receiving module, the determining module selects the target RFID apparatus according to the relay paths,
   wherein when the determining module determines to allow the RFID apparatus to process the content of the RF signal, the determining module further processes the content of RF signal according to an operating mode of the RFID apparatus,
   the apparatus further comprising:
   a network module, coupled to the determining module, for decapsulating or encapsulating the RF signal;

wherein, when the operating mode is a network mode, the determining module transmits the RF signal to the network module;

a tag module, coupled to the determining module, for performing a function of an RFID tag;

wherein, when the operating mode is a tag mode, the determining module transmits the RF signal to the tag module, which generates a reply signal according to the content of the RF signal, and the reply signal is transmitted via the transmitting/receiving module; and a reading module, coupled to the determining module, for performing a function of an RFID reader;

wherein, when the operating mode is not the network mode or the tag mode, the determining module transmits the RF signal to the reading module, which generates a reading signal according to the content of the RF signal, and the reading signal is transmitted via the transmitting/receiving module.

2. The RFID apparatus as claimed in claim 1, wherein the relay paths are associated with electronic product codes (EPCs) of the RFID apparatus and the target RFID apparatus.

3. The apparatus of claim 1, wherein the determining module selects the target RFID apparatus according to an Electronic Product Code (EPC) of a relay destination.

4. The apparatus of claim 1, wherein the determining module selects a given relay path from the relay paths according to a longest prefix match (LPM) approach.

* * * * *